Nov. 23, 1943.  H. E. VOORHIES  2,334,970
TESTER FOR HYDRAULIC VALVE LIFTERS
Filed May 7, 1942
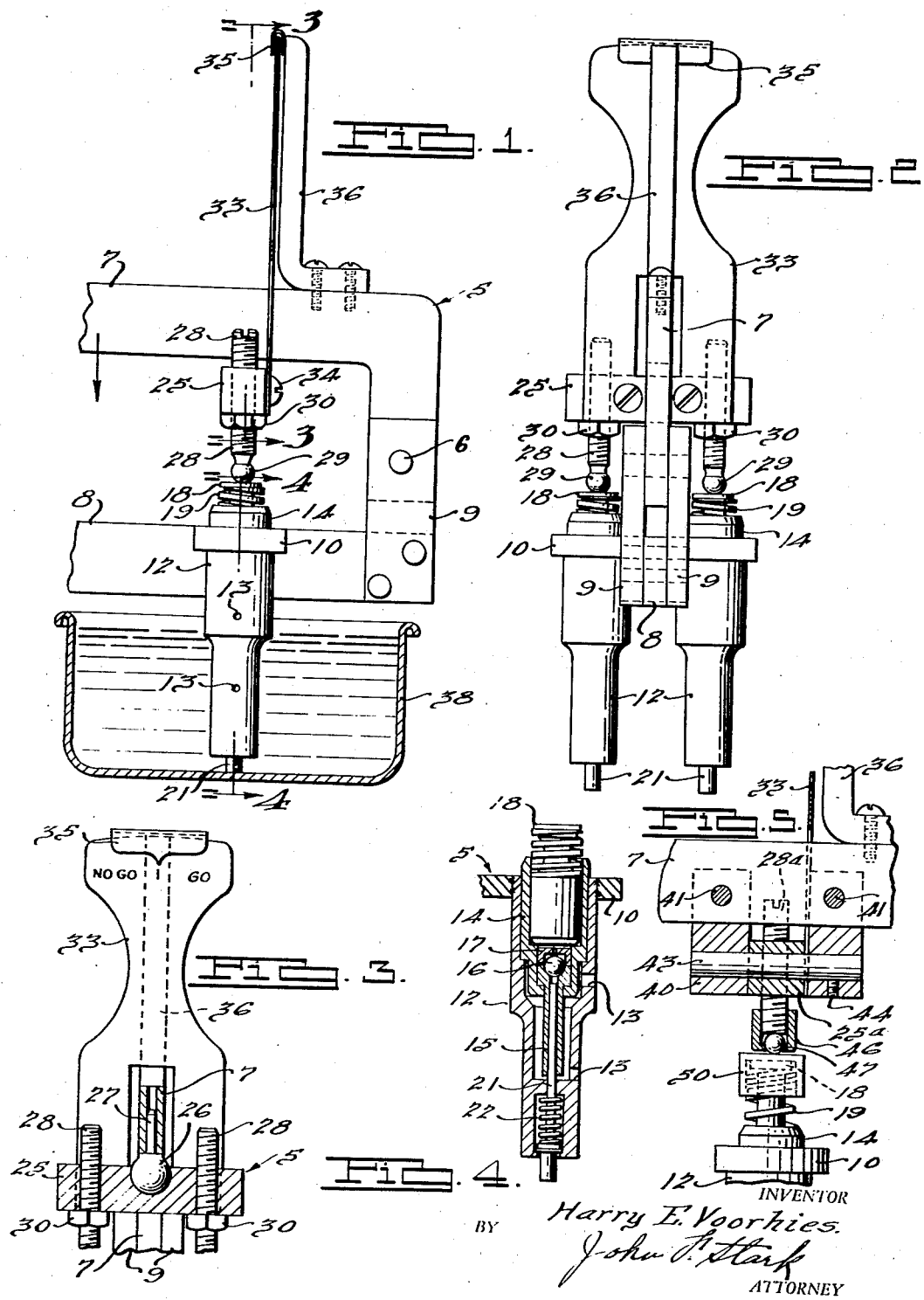
INVENTOR
Harry E. Voorhies.
BY John F. Stark
ATTORNEY Patented Nov. 23, 1943

2,334,970

UNITED STATES PATENT OFFICE 2,334,970

TESTER FOR HYDRAULIC VALVE LIFTERS

Harry E. Voorhies, Grosse Pointe Woods, Mich., assignor to Eaton Manufacturing Company, Cleveland, Ohio, a corporation of Ohio Application May 7, 1942, Serial No. 442,047

8 Claims. (Cl. 73—51)

This invention relates to testing tools in general, and, more particularly, concerns a test tool for hydraulic valve lifters as used to operate the valve mechanism of internal combustion engines and the like.

The principal object of this invention is the provision of a testing device of simple, rugged, economical construction which is adapted to quickly test a hydraulic valve lifter of vehicle engines being repaired in service stations, and without the use of any other expensive time regulated mechanisms; the provision in a testing tool, as described, in which the hydraulic valve lifter to be tested is matched against a master hydraulic lifter of known operating characteristics which is supplied by the manufacturer with the testing tool.

Among the objects of the invention is the provision in a testing tool for a hydraulic valve lifter of a pair of lifter receiving pockets for reception of a master hydraulic lifter, having known operating characteristics, and a hydraulic lifter, of questionable operating characteristics, and including means for positively unseating the check valves of the hydraulic lifters to insure quick and adequate induction of testing fluid into the lifters when the assembled tool and lifter is dipped in a bath of testing fluid; the provision in a hydraulic lifter testing tool, as described, of means for accommodating lifters of different longitudinal length without alteration of the testing tool.

Further and other objects and advantages of the invention reside in the novel combination and arrangement of parts about to be described when taken in conjunction with the drawing forming a part of this specification, and are more particularly pointed out in the appended claims.

In the drawing like reference characters denote corresponding parts throughout the several views, and in which:

Fig. 1 is a side elevational view of a testing tool embodying the teaching of this invention; and Fig. 2 is an end elevational view of the same device, as seen from the right hand side of Fig. 1; and Fig. 3 is a detail view of the scale indicating mechanism of the device, taken substantially on the line 3—3 of Fig. 1; and Fig. 4 is a vertical sectional view through a hydraulic lifter test unit, illustrating pin means used to unseat the check balls, and taken on the line 4—4 of Fig. 1; and Fig. 5 is a side elevational view, with portions in section, to reveal a modified mounting means for the adjusting screws and scale pointer mechanism.

In the practical application of such tester tools difficulty has been experienced with such devices as were offered because of the unduly long period required to induct a charge of testing fluid into the lifter chamber for observing the check valve action and the leak down rate as compared to a master unit of known operating characteristics. Such a device is shown in Patent Number 2,263,801, dated November 25, 1941, for "Tester for hydraulic valve lifters," issued to George M. Graham. In the use or operation of this patented tool, due to the ball check valve of the hydraulic tappet to be tested making such a perfect seat in the valve cage, or sticking on the seat from foreign matter picked up in service use, and the absence of any pressure on the testing fluid in which it is tested, comparable to conditions in service use in an engine, great difficulty has been encountered and in same cases it has been impossible without resorting to separate external means, to cause the ball check valve to rise off its seat when the testing fluid is introduced beneath the valve in the tool to obtain a charge of fluid in the master tappet and tappet to be tested. The present invention overcomes this difficulty in a novel manner by means integral with the testing tool about to be described.

In the drawing, and particularly Figs. 1 and 2 there is shown by way of example, a preferred form of hydraulic valve lifter testing tool, generally designated 5. A skeleton framework or support structure comprises upper and lower, generally rectangular, elongated handle members 7 and 8, respectively. The lower handle member has a pair of short upstanding legs 9, rivetted or otherwise secured, on either side of the right hand end thereof, as seen in Fig. 1, which includes a pin means 6 for reception therebetween of a right-angled bent portion of the upper handle member 7, whereby the upper handle may pivot or fulcrum about the pin as a hinge in a nutcracker or tong fashion. An apertured plate member 10 is secured at its mid-point transversely across the lower handle member, and at a distance from the pivot axis to afford an easy workable leverage, and which is adapted to support a pair of sockets or hollow barrel members 12, equally spaced from the axes of the handle members, for reception of a master and questionable hydraulic tappet unit to be tested. As shown, the suspended socket or barrel members 12 have a reduced lower hollow tubular portion of different size bores and a lower counterbored passage for a purpose to be described. A pair of openings 13 on different levels in the side wall of the barrel members 12 afford secondary openings adjacent the end of the hydraulic unit suction tube to accommodate different size units and assure ample fluid being fed to the same.

Although the hydraulic valve lifter per se forms no part of this invention a knowledge of the working parts thereof being affected in the testing operation will serve to acquaint the reader with the manner in which it functions. A separate cylinder 14 which, in service, is normally received in a tappet body, that has a lower closed end forming an oil reservoir, is here, for test purposes, supported in the socket member 12. The lower end of the cylinder 14 has a reduced counterbore in which is pressed a suction tube 15, the upper counterbored end of which provides a seat for a ball check valve 16 over which lies a valve retaining cage 17 providing limited valve movement and controlling flow of hydraulic fluid into a high compression chamber above the valve cage in the separate cylinder and below a plunger 18 which is biased outwardly by a spring 19. In service a valve stem end, or other part of the valve gear, contacts the head of the plunger 18 and by raising and lowering of the plunger hydraulic fluid is pumped into the high compression chamber past the check valve 16 and trapped there, except for a predetermined leakage or fluid escapement from this chamber, which thus measures the leak down rate that is to be checked in the present test tool against a master unit of known operating characteristics and leak down rate.

As aforementioned, the seal that the ball check valve 16 makes with its seat is very complete in most cases and only a slight amount of foreign matter or some slight wedging may cause the valve to stick on its seat. Consequently, when the hydraulic unit 5 is placed in the test socket for testing since there is no pressure on the testing fluid, as in normal use in an engine, it has been found most difficult to cause the valve 16 to rise off its seat by merely pumping up and down on the handles 7 and 8. Accordingly, to insure positive displacement of the ball check valve, there has been placed in the lower counterbored end of the socket 12, a loosely fit plunger pin 21 which projects at one end a short distance from the lower portion of the socket and is normally pressed by a spring 22 away from contact with the check valve at its other end, and the whole assembly being held in the socket by an inturned lip on the lower margin of the socket.

In Figs. 1, 2, and 3 there is best shown, the means adapted to register the condition of the hydraulic unit to be tested. A generally rectangular mounting bar 25 with a pocket centrally disposed therein is used for reception of a ball-headed stud 26 and its fastening pin 27 for supporting the bar 25 in the upper handle 7 to accommodate universal movement thereof. A pair of threaded screws 28 having ball ends 29 and jam nuts 30 are adjustably received through the bar 25 equi-distant from the central ball stud and in position to contact the heads of the tappet plunger 18, when properly adjusted. A dial or scale plate 33 is secured by any suitable fastening means 34 to the rear face of the moveable mounting bar 25 in upstanding position, while a stationary pointer means 35 is horizontally secured by welding or rivetting to the upper end of an L shaped standard 36 mounted upon the upper handle member 7. Any suitable indicating means such as "Go" and "No Go" may be inscribed upon opposite sides of a center marker whereby relative movement between the pointer 35 and scale 33 will indicate the test record, as will be further described.

The use, operation and function of the parts thus described is as follows: For sake of uniformity, and to match with the scale marking, a master hydraulic unit of known leak down operating characteristics is always placed in the left hand socket 12, when viewing the scale 33 from the front as in Fig. 3. Previous to being tested the hydraulic units should be thoroughly cleaned to remove any foreign matter or thick viscous oil, which had been used as the hydraulic operating fluid from the engine sump or crankcase when in service use, because the testing fluid, in this case clean kerosene, is of substantially different viscosity. The hydraulic unit is then reassembled making certain to snap the plunger spring 19 in the counterbore of the separate cylinder 14, and the unit, as shown, minus the usual outside tappet body, not shown, is introduced in the socket 12 and the testing tool 5 is dipped in a pan of kerosene 38 so that the plunger pins 21 rest upon the bottom of the pan 38, thereby, positively unseating the check valves 16 regardless of any which may be stuck on its seat or any foreign matter in the residue oil in the valve cage, and the openings 13 are both covered by the top level of the kerosene. The upper handle 7 is then pumped up and down a couple of times to make certain a charge of testing fluid is drawn into the hydraulic compression chamber by suction of the plunger 18. It will be understood, of course, that the adjusting screws 28 are adjusted so that the longitudinal axes thereof are parallel to the axes of the sockets 12 and the pointer or indicator 35 is exactly on the center mark of the scale plate 33. After the handles have been pumped up and down so that the plungers 18 bottom and each of the units have a full charge of testing fluid, the upper handle 7 is released to retain the charge, under suction of the plunger, the tool is removed from the test fluid, and the handle 7 is again compressed and the scale indicator watched to view its direction of travel. If the stationary pointer remains on the center mark of the scale or the scale moves so that the "Go" side of the scale is under the pointer, it indicates the unit being tested has the same or a lower rate of leakdown than the master unit and is acceptable; if the scale moves so that the "No go" side of the scale is under the pointer, a faster leakdown rate is indicated and the unit is defective and should be replaced.

In Fig. 5 there is shown a detail of a slightly modified mounting means for a bar 25a, similar to bar 25, which mounts adjusting screws 28a and the scale pointer mechanism 33. In this instance to overcome torsion and twisting which may take place in the ball and socket joint 26, previously described, a pair of bifurcated hangers 40 are adapted to slip around the arm of the upper handle 7 and be fastened by any suitable means such as the pins 40 shown, and openings through the hangers parallel to the axis of the handle 7 journal a shaft 43, which is prevented from endwise movement by a set screw 44. The modified mounting bar 25a is then rotatably mounted upon the fixed shaft 43, between the hangers, and adjusting screws 28a threaded therethrough, as screws 28, previously described. The screw 28a in this instance has an apertured cap member 46 secured over the lower end thereof which retains a ball member 47 that projects through the cap aperture to provide a rolling contact with the test unit plunger, or other member interposed on the head thereof. Such a member is shown as an inverted cup like member 50 which caps the end of the plunger 18, and may be necessary in certain hydraulic units as used in over head valve engines, wherein a cup is formed in the head of the plunger to receive the usual push rod of the valve gear mechanism (not shown), so as to provide a flat surface on which the screws 28 or 28a may bear and roll. With this mounting means it will be seen the bar 25a is restrained from rotation in any plane excepting on an axis of rotation parallel to the longitudinal axis of the handle 7, and the movable dial or scale 33, mounted thereon, likewise follows a plane path normal to said axes.

From the foregoing disclosures it will be apparent there has been described a novel tester tool for testing various types of hydraulic tappet units, and which embodies among other things two objects and advantages of the invention first enumerated. It is not intended to be limited, however, to the specific examples of the invention shown as many formal modifications will now be suggested to those skilled in the art to which it relates, and the spirit and substance of the invention is considered commensurate with the scope of the following claims.

What I claim is:

1. A valve lifter hydraulic testing tool comprising a pair of tong means operable pincerwise, a pair of valve lifter sockets including openings to admit liquid thereto mounted transversely of the longitudinal axis on one of said tongs adjacent the pincer end, loosely fit means projecting from the lower ends of said valve lifter sockets adapted to unseat check valves in the valve lifters therein, a cross beam having bearing portions overlying said lifter sockets and fulcrumed on the axis of said other tong, and indicator mechanism coupled with said cross beam to indicate angular movement of the beam transverse thereto.

2. A valve lifter hydraulic testing tool comprising in combination, elongated upper and lower handle means pivotally connected at one end and relatively movable with respect to each other, a pair of valve lifter sockets including openings to admit liquid thereto mounted transversely and equi-distant from the longitudinal axis of said lower handle means, loosely fit spring-pressed plunger pin means projected from the lower ends of said sockets adapted to rest upon the bottom of a hydraulic fluid container, said plunger pins arranged to unseat check valves in said lifters when seated upon said fluid container bottom, a cross beam having bearing portions overhanging said lifter sockets and pivotally supported by said upper handle means, and indicator mechanism coupled with said cross beam to indicate angular movement of the beam transverse thereto.

3. A valve lifter hydraulic testing tool comprising a pair of elongated handle means hinged at one end and operable in lever arm fashion, a pair of valve lifter sockets including openings to admit liquid thereto mounted transversely on either side of the longitudinal axis of one of said handles at a distance from the hinged end thereof to provide an easy workable leverage when said handles are operated in lever arm fashion, resiliently pressed means projected from the lower ends of said valve lifter sockets adapted to hold open check valves in said valve lifters therein when said tool is rested upon said resilient means in the bottom of a hydraulic fluid container, a cross beam having opposed ends with bearing portions overlying said valve lifter sockets and movable about an axis parallel to the other of said handles, and indicator mechanism supported by said cross beam to indicate angular movement of the beam transverse thereto.

4. A valve lifter hydraulic testing tool comprising a pair of elongated handle means hinged at one end and operable in lever arm fashion, a pair of valve lifter sockets including openings to admit liquid thereto mounted transversely on either side of the longitudinal axis of one of said handles at a distance from the hinged end thereof to provide an easy workable leverage when said handles are operated in lever arm fashion, resiliently pressed means projected from the lower ends of said valve lifter sockets adapted to hold open check valves in said valve lifters therein when said tool is rested upon said resilient means in the bottom of a hydraulic fluid container, a cross beam having opposed ends with bearing portions overlying said valve lifter sockets and moveable about an axis parallel to the other of said handles, said bearing portions comprising adjustable screw threaded means with lower ball-like end portions to provide rolling contact with said valve lifters, and indicator mechanism supported by said cross beam to indicate angular movement of the beam transverse thereto.

5. A valve lifter hydraulic testing tool comprising a pair of elongated handle means hinged at one end and operable in lever arm fashion, a pair of valve lifter sockets including openings to admit liquid thereto mounted transversely on either side of the longitudinal axis of one said handles at a distance from the hinged end thereof to provide an easy workable leverage when said handles are operated in lever arm fashion, resiliently pressed means projected from the lower ends of said valve lifter sockets adapted to hold open check valves in said valve lifters therein when said tool is rested upon said resilient means, a cross beam having opposed ends with bearing portions overlying said valve lifter sockets and moveable about an axis parallel to the other of said handles, said bearing portions comprising adjustable screw threaded means with lower ball-like end portions to provide rolling contact with separate inverted cup-like members adapted to be fitted on and cap said valve lifters, and indicator mechanism supported by said cross beam to indicate angular movement of the beam transverse thereto.

6. A valve lifter hydraulic testing tool comprising tong means operable pincerwise, a pair of valve lifter sockets including openings to admit liquid thereto mounted transversely of the longitudinal axis on one of said tongs adjacent the pincer end, loosely fit means projecting from the lower end of said valve lifter sockets adapted to unseat check valves in the valve lifters therein when said tool is bottomed in a hydraulic fluid container into which it is to be dipped in testing said valve lifters, a cross beam having bearing portions overlying said lifter sockets and supported by ball and socket means on the axis of said other tong, indicator mechanism supported by said cross beam to indicate angular movement thereof, and a stationary pointer means overlying the face of said indicator to visually indicate the movement thereof.

7. A valve lifter hydraulic testing tool comprising a pair of tong means operable pincerwise, a pair of valve lifter sockets mounted transversely of the longitudinal axis on one of said tongs adjacent the pincer end, loosely fit means projecting from the lower ends of said valve lifter sockets adapted to unseat check valves in the valve lifters therein when said tool is bottomed in a hydraulic fluid container into which it is to be dipped in testing said valve lifters, said valve lifter sockets having a plurality of hydraulic fluid inlet openings on different levels to accommodate variable length valve lifters therein and insure adequate fluid coverage when the tool is placed in said hydraulic fluid containers, a cross beam having bearing portions overlying said lifter sockets and fulcrumed on the axis of said other tong, and indicator mechanism coupled with said cross beam to indicate angular movement of the beam transverse thereto.

8. A valve lifter hydraulic testing tool comprising a pair of tong means operable pincerwise, a pair of valve lifter sockets including openings to admit liquid thereto mounted transversely of the longitudinal axis on one of said tongs adjacent the pincer end, loosely fit means projecting from the lower ends of said valve lifter sockets adapted to unseat check valves in the valve lifters therein when said tool is bottomed in a hydraulic fluid container into which it is to be dipped in testing said valve lifters, a cross beam having bearing portions overlying said lifter sockets and rotatably supported on a fixed axle parallel to said tongs, and moveable indicator mechanism and stationary pointer means, supported respectively on said cross beam and said other tong, to swing in response to tilting of the cross beam.

HARRY E. VOORHIES.